(12) United States Patent
Berkowitz et al.

(10) Patent No.: US 8,591,604 B2
(45) Date of Patent: *Nov. 26, 2013

(54) BATTERY ELECTRODES

(75) Inventors: Fred J. Berkowitz, New Milford, CT (US); Bhupendra K. Patel, Danbury, CT (US); Maya Stevanovic, Danbury, CT (US)

(73) Assignee: The Gillette Company, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/612,706

(22) Filed: Sep. 12, 2012

(65) Prior Publication Data

US 2013/0004816 A1 Jan. 3, 2013

Related U.S. Application Data

(60) Continuation of application No. 12/795,884, filed on Jun. 8, 2010, now Pat. No. 8,298,695, which is a division of application No. 11/508,672, filed on Aug. 23, 2006, now Pat. No. 7,867,553.

(51) Int. Cl.
*H01M 4/00* (2006.01)
*H01M 4/04* (2006.01)

(52) U.S. Cl.
USPC .............................. 29/623.5; 427/58; 429/94

(58) Field of Classification Search
USPC .............................. 29/623.5; 427/58; 429/94
See application file for complete search history.

(56) References Cited

U.S. PATENT DOCUMENTS

| 345,123 A | 7/1886 | DeVirloy |
| 4,163,829 A | 8/1979 | Kronenberg |
| 4,279,972 A | 7/1981 | Moses |
| 4,401,735 A | 8/1983 | Moses et al. |
| 4,450,214 A | 5/1984 | Davis |
| 4,481,267 A | 11/1984 | Bowden et al. |
| 4,489,144 A | 12/1984 | Clark |
| 4,526,846 A | 7/1985 | Kearney et al. |
| 4,808,497 A | 2/1989 | Blomgren et al. |
| 4,891,283 A | 1/1990 | Bowden et al. |
| 4,952,330 A | 8/1990 | Leger et al. |
| 5,158,722 A | 10/1992 | Ilic et al. |
| 5,176,968 A | 1/1993 | Blasi et al. |
| 5,219,683 A | 6/1993 | Webber |
| 5,229,227 A | 7/1993 | Webber |

(Continued)

FOREIGN PATENT DOCUMENTS

| JP | 61-077255 | 4/1986 |
| JP | 01-194265 | 8/1989 |

(Continued)

OTHER PUBLICATIONS

Stevanovic, U.S. Appl. No. 11/508,680, "Battery", Aug. 23, 2006.

(Continued)

*Primary Examiner* — Milton I Cano
*Assistant Examiner* — Brent Thomas
(74) *Attorney, Agent, or Firm* — Leo J. White; Kevin C. Johnson; Steven W. Miller

(57) ABSTRACT

A cathode includes a foil current collector including a coating containing iron disulfide on one side that covers less than 100% of the side.

13 Claims, 4 Drawing Sheets

(56) References Cited

U.S. PATENT DOCUMENTS

| | | |
|---|---|---|
| 5,290,414 A | 3/1994 | Marple |
| 5,432,030 A | 7/1995 | Vourlis |
| 5,514,491 A | 5/1996 | Webber |
| 5,595,841 A | 1/1997 | Suzuki |
| 5,691,083 A | 11/1997 | Bolster |
| 6,027,835 A | 2/2000 | Fukumura et al. |
| 6,218,054 B1 | 4/2001 | Webber |
| 6,730,136 B2 | 5/2004 | Webber |
| 6,849,360 B2 | 2/2005 | Marple |
| 7,867,553 B2 * | 1/2011 | Berkowitz et al. ............ 427/115 |
| 2003/0070283 A1 | 4/2003 | Webber |
| 2003/0113622 A1 | 6/2003 | Blasi et al. |
| 2003/0186095 A1 | 10/2003 | Okutani et al. |
| 2003/0215700 A1 | 11/2003 | Hosoda et al. |
| 2003/0228518 A1 | 12/2003 | Marple |
| 2004/0265700 A1 | 12/2004 | Ugawa et al. |
| 2005/0112462 A1 * | 5/2005 | Marple .................. 429/209 |
| 2005/0112467 A1 | 5/2005 | Berkowitz et al. |
| 2005/0202320 A1 | 9/2005 | Totir et al. |
| 2005/0277023 A1 | 12/2005 | Marple et al. |
| 2006/0008701 A1 | 1/2006 | Kim et al. |
| 2006/0046152 A1 | 3/2006 | Webber |
| 2006/0046153 A1 | 3/2006 | Webber |
| 2006/0046154 A1 | 3/2006 | Webber et al. |
| 2008/0026293 A1 | 1/2008 | Marple et al. |

FOREIGN PATENT DOCUMENTS

| | | |
|---|---|---|
| JP | 04-012471 | 1/1992 |
| JP | 04-109551 | 4/1992 |
| JP | 10-012220 | 1/1998 |
| JP | 11-265707 | 9/1999 |
| JP | 2007-080791 | 3/2007 |
| WO | WO 03/105255 A2 | 12/2003 |

OTHER PUBLICATIONS

Stevanovic, U.S. Appl. No. 11/313,509, "Cathode for Battery", Dec. 21, 2005.

Ishikawa et al., "Pretreatment of Li metal anode with electrolyte additive for enhancing LI cycleability", Journal of Power Sources, vol. 146, pp. 199-203, 2005.

Berkowitz et al., U.S. Appl. No. 10/675,512, "Batteries", Sep. 30, 2003.

David Linden, Handbook of Batteries, pp. 11-79 to 11-81, 1995.

Ishikawa et al., "In Situ Vibrating Electrode Technique for the Characterization of Interface Between Lithium Electrode and Electrolytes Containing Additives", Journal of the Electrochemical Society, vol. 141, No. 12, Dec. 1994.

Falk et al., "Alkaline Storage Batteries", John Wiley & Sons, Inc., pp. 1-41, 1969.

* cited by examiner

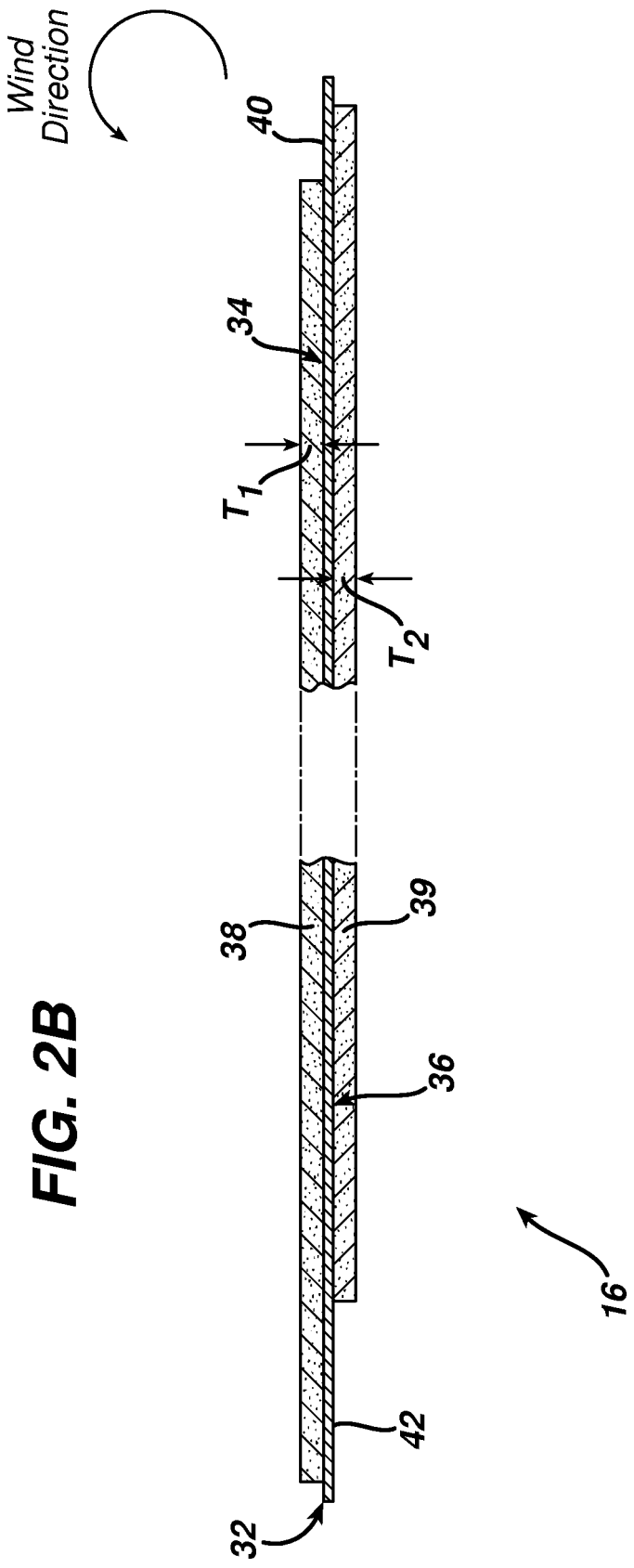

BATTERY ELECTRODES

CROSS-REFERENCE TO RELATED APPLICATION

This application is a continuation application of and claims priority to U.S. Ser. No. 12/795,884, filed on Jun. 8, 2010, now U.S. Pat. No. 8,298,695, which in turn is a divisional application of and claims priority to U.S. Ser. No. 11/508,672, filed on Aug. 23, 2006, now U.S. Pat. No. 7,867,553. Both are hereby incorporated by reference.

TECHNICAL FIELD

The invention relates to batteries, as well as to related components and methods.

BACKGROUND

Batteries or electrochemical cells are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

One type of battery includes a cathode having iron disulfide as the cathode active material.

SUMMARY

The invention relates to cathodes including iron disulfide and batteries including the cathodes.

In one aspect, the invention features a cathode including a current collector in the form of a foil. The foil has a first side having a coating including iron disulfide, and a second side also having a coating including iron disulfide. Significantly, the first coating covers less than 100% (for example, less than about 90%) of the first side.

In some embodiments, the second coating covers less than 100% of the second side, and the first coating covers a higher percentage of the first side than the second coating covers of the second side.

In some embodiments, the cathode is in a spiral-wound configuration including a core portion having an inner surface and an exterior portion having an outer surface. The inner surface and/or the outer surface are at least 50% free (for example, at least 90% free) of a coating including iron disulfide.

In another aspect, the invention features a cathode including a current collector in the form of a foil. Both sides of the current collector have a coating including iron disulfide. Significantly, the cathode varies in thickness (for example, by at least 10% or at least about 20%) along its length.

Other aspects of the invention include batteries including the cathode described above and methods of making the cathodes and batteries.

In a further aspect, the invention features a method of making a cathode by coating a slurry including iron disulfide onto a first side of a cathode current collector using an intermittent coating process. In some embodiments, the coating provides patches of the slurry on the first side separated by uncoated spaces.

In some embodiments, the method further includes coating a slurry including iron disulfide onto the second side of the cathode current collector using an intermittent coating process. In certain embodiments, the coating provides second patches of slurry on the second side separated by spaces without slurry, and a first patch overlaps lengthwise with a second patch.

In some embodiments, the intermittent coating process involves reverse roll coating.

Other aspects, features, and advantages of the invention are in the drawings, description, and claims.

DESCRIPTION OF DRAWINGS

FIG. 2B is a cross-sectional view of the cathode in FIG. 2A, unwound.

DETAILED DESCRIPTION

Figure 1:
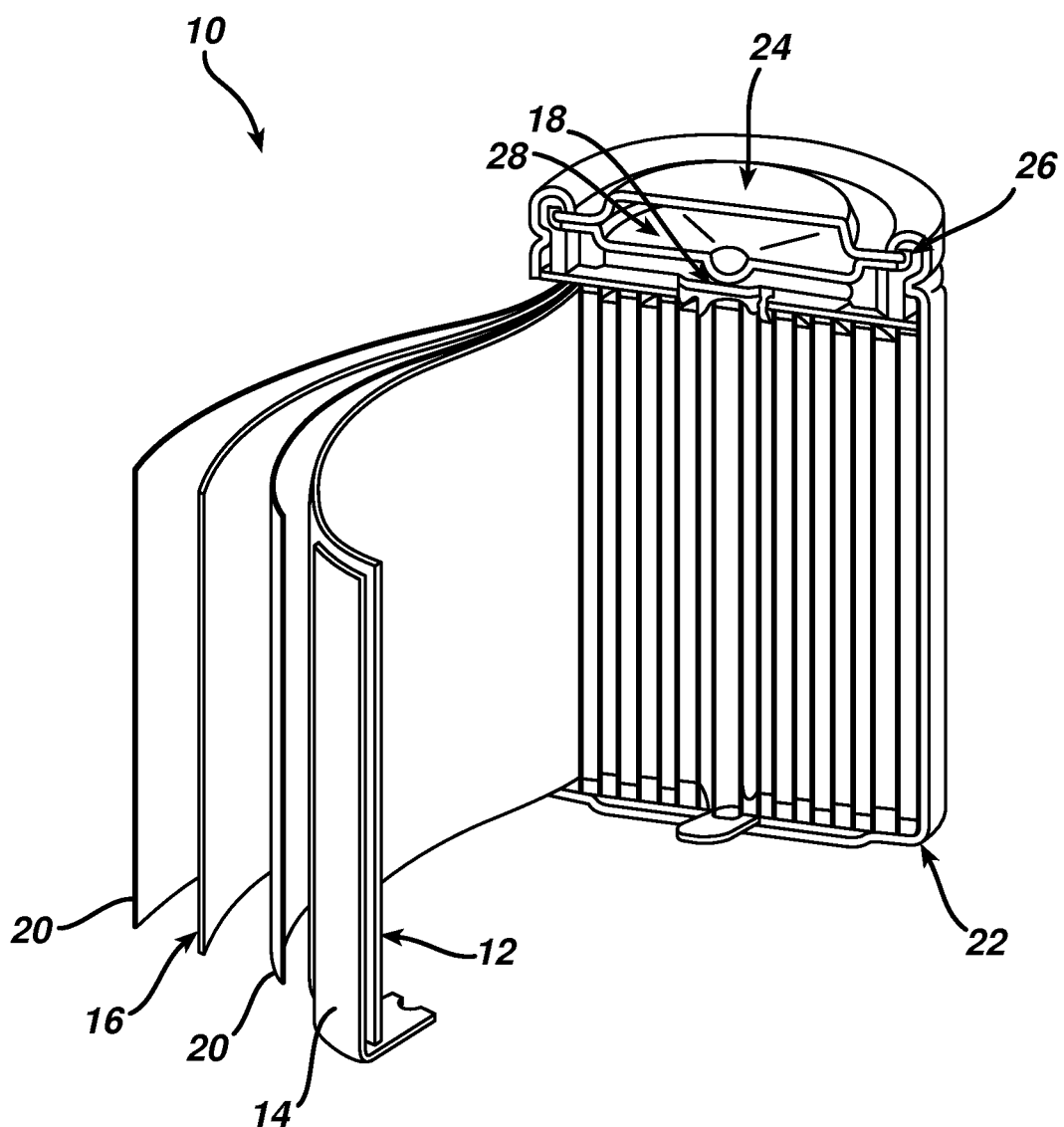
FIG. 1 is a sectional view of an embodiment of a non-aqueous electrochemical cell.

Referring to FIG. 1, an electrochemical cell 10 includes an anode 12 in electrical contact with a negative lead 14, a cathode 16 in electrical contact with a positive lead 18, a separator 20, and an electrolyte. Anode 12, cathode 16, separator 20, and the electrolyte are contained within a case 22. The electrolyte includes a solvent system and a salt that is dissolved in the solvent system. Electrochemical cell 10 further includes a cap 24 and an annular insulating gasket 26, as well as a safety valve 28.

Figure 2A:
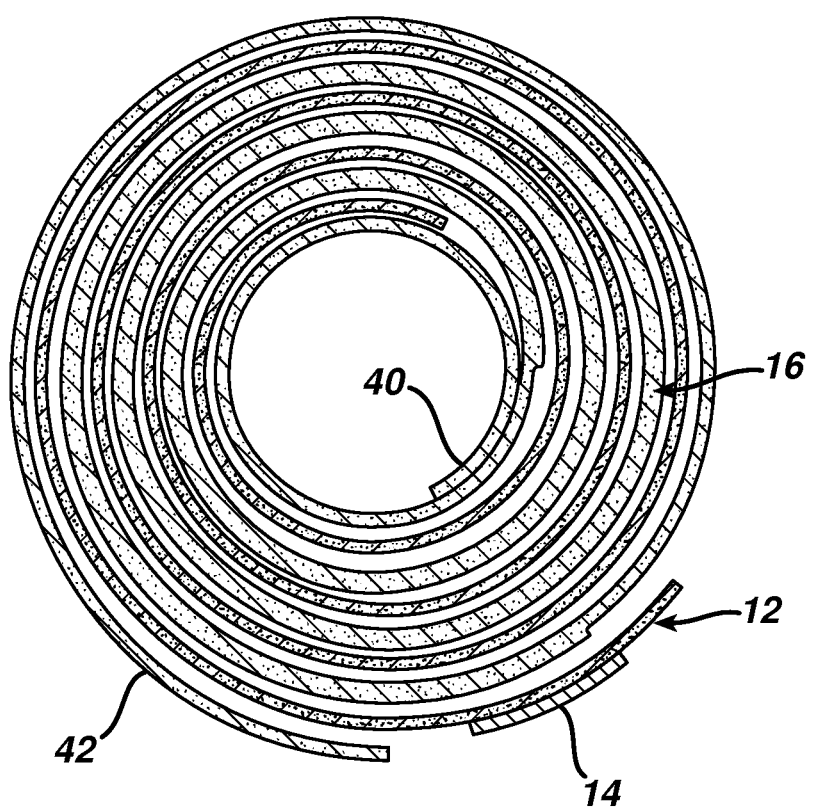
FIG. 2A is a cross-sectional view of the cathode/anode in the electrochemical cell in FIG. 1.

As shown in FIG. 2A, cathode 16 is wound in a spiral configuration. Referring to FIG. 2B, cathode 16 can be unwound to a planar configuration. Cathode 16 includes a cathode current collector 32. The cathode current collector is a foil having a first side 34 having a coating 38 and a second side 36 having a coating 39. Coatings 38 and 39 include iron disulfide, which is the cathode active material in the cathode. The coatings can also include one or more conductive materials (e.g., conductive aids, charge control agents) and/or one or more binders. Lead edge 37 of cathode 16 is uncoated on both sides.

Referring again to FIGS. 2A and 2B first side 34 includes an uncoated surface 40, and second side 36 includes an uncoated surface 42. In a wound configuration, uncoated inner surface 40 is located at the core spiral of cathode 16, while uncoated outer surface 42 is at the outer spiral of cathode 16. This decreases the amount of cathode active material located at the core spiral and the outer spiral of cathode 16 that is not in contact with active materials of the opposite polarity, and thus increases the interior volume available for more actives in battery 10. An increase in the interior volume in battery 10 can, for example, allow a greater amount of active materials of opposite polarity in contact with one another to be incorporated within battery 10, which can result in enhanced electrochemical cell performance.

In some embodiments, uncoated surfaces 40 and 42 have areas of at least about 5% (e.g., at least about 10%, at least about 15%, at least about 20%, at least about 25%, at least about 30%, at least about 35%, at least about 40%, at least about 45%) and/or at most about 50% (e.g., at most about 45%, at most about 40%, at most about 35%, at most about 30%, at most about 25%, at most about 20%, at most about 15%, at most about ten %) of the areas of first and second sides 34 and 36, respectively.

In the embodiment shown in FIGS. 2A and 2B, uncoated surface 42 has a larger area than the area of uncoated surface 40. The difference between the % by area of side 34 occupied by uncoated surface 40 and the % by area of side 36 occupied by uncoated surface 42 is at least about five % (e.g., at least about 10%, at least about 15%, at least about 20%, at least about 25%, at least about 30%, at least about 35%, at least about 40%, at least about 45%) and/or at most about 50% (e.g., at most about 45%, at most about 40%, at most about 35%, at most about 30%, at most about 25%, at most about 20%, at most about 15%, at most about 10%).

Coatings 38 and 39 cover less than 100% (e.g., less than about 95% less than about 90%, less than about 85%, less than about 80%, less than about 75%, less than about 70%, less than about 65%, less than about 60%, less than about 55%) by area and/or more than about 50% (e.g., more than about 55%, more than about 60%, more than about 65%, more than about 70%, more than about 75%, more than about 80%, more than about 85%, more than about 90%, more than about 95%) by area of first and second sides 34 and 36, respectively.

In the embodiment shown in FIGS. 2A and 2B, coating 38 covers a higher percentage by area of first side 34 than coating 39 covers of second side 36. The difference between the percentage coverage of coating 38 on side 34 and the percentage coverage of coating 38 on side 36 can be at least about 5% (e.g., at least about 10%, at least about 15%, at least about 20%, at least about 25%, at least about 30%, at least about 35%, at least about 40%, at least about 45%) and/or at most about 50% (e.g., at most about 45%, at most about 40%, at most about 35%, at most about 30%, at most about 25%, at most about 20%, at most about 15%, at most about 10%).

Coatings 38 and 39 have thicknesses $T_1$ and $T_2$, respectively. In some embodiments, $T_1$ and $T_2$ can be more than about 75 microns (e.g., more than 100 microns, more than 125 microns) and/or less than about 150 microns (e.g., less than about 125 microns, less than 100 microns). Coatings 38 and 39 can have the same thickness or can have different thicknesses.

Cathode current collector 32 is a foil and can be formed of, for example, one or more metals and/or metal alloys. Examples of metals include titanium, nickel, and aluminum. Examples of metal alloys include aluminum alloys (e.g., 1N30, 1230) and stainless steel. In certain embodiments, cathode current collector 32 can be a relatively thin foil (e.g., a thin flexible sheet). For example, cathode current collector 32 can be a foil having a thickness of at most about 35 microns (e.g., at most about 30 microns, at most about 25 microns) and/or at least about 20 microns (e.g., at least about 25 microns, at least about 30 microns). In certain embodiments, one or more primers can be applied to the foil.

In some embodiments, first side 34 and/or second side 36 has a loading of at least about 20 milligrams (e.g., at least about 21.5 milligrams, at least about 23 milligrams, at least about 25 milligrams, at least about 28 milligrams), and/or at most about 35 milligrams (e.g., at most about 34 milligrams, at most about 33 milligrams), of the coating per square centimeter per side of the current collector. As used herein, the loading of coating on a side is calculated according to formula (I) below, in which $L_{cm}$=loading of coating on the selected side, $M_{cat}$=mass of the coated cathode, $M_{cc}$=mass of the cathode current collector, N=number of coated sides on the cathode current collector, and $A_{cc}$=coated area of the cathode current collector:

$$L_{cm}=(M_{cat}-M_{cc})/NA_{cc} \quad (1)$$

For this calculation, the areas of the cathode coating and the foil being weighed are the same.

Coatings 38 and 39 generally include at least about 85% by weight (e.g., at least about 87% by weight, at least about 89% by weight, at least about 91% by weight, at least about 92% by weight) and/or at most about 95% by weight (e.g., at most about 94% by weight, at most about 93% by weight) of iron disulfide.

Examples of conductive materials include conductive aids and charge control agents. Specific examples of conductive materials include carbon black, graphitized carbon black, acetylene black, and graphite. The conductive materials can be used to enhance the electronic conductivity of cathode 16 within electrochemical cell 10. Coatings 38 and 39 generally can include up to about 8% by weight (e.g., up to about 6% by weight) and/or at least about 3% by weight of one or more conductive materials.

Examples of binders include linear di- and tri-block copolymers. In certain embodiments, the linear di- and tri-block copolymers can be substantially free of double bonds in their primary polymer chains, and/or can include conjugated double bonds in their primary polymer chains. In some embodiments, a binder can include polystyrene (e.g., in an amount of from 29% by weight to 33% by weight). Additional examples of binders include linear tri-block polymers cross-linked with melamine resin; ethylene-propylene copolymers (e.g., with an ethylene content of at least about 40%); ethylene-propylene-diene terpolymers (e.g., with ethylene contents below about 70%); tri-block fluorinated thermoplastics (e.g., TFE/HFP/VF2 terpolymer, in which TFE is tetrafluoroethylene, HFP is hexafluoropropylene, and VF2 is vinylidene fluoride); fluorinated polymers (e.g., polytetrafluoroethylene (PTFE)); hydrogenated nitrile rubber (e.g., with at least about 30% acrylonitrile); fluoro-ethylene-vinyl ether copolymers; thermoplastic polyurethanes (TPU); thermoplastic olefins (TPO); styrene-ethylene-butylene-styrene (SEBS) block copolymers (e.g., Kraton® G1651 polymer); and polyvinylidene fluoride (PVDF) homopolymers (e.g., Kynar® 761 polymer). In some embodiments, the cathode material can include a binder that is formed of a film-forming polymer. As used herein, a film-forming polymer can be added to a solvent to form a solution, which can then be dried to form a film.

Coatings 38 and 39 generally include, for example, at most about 3% by weight (e.g., at most about 2% by weight, at most about 1% by weight) and/or at least about 0.5% by weight (e.g., at least about 1% by weight, or at least about 2% by weight) of one or more binders.

Cathode 16 can be formed in any of a number of different ways. In a preferred embodiment, cathode 16 can be formed as follows.

The iron disulfide, conductive materials, and/or binders are combined with one or more solvents to form a slurry (e.g., by dispersing iron disulfide, conductive materials, and/or binders in the solvents using a double planetary mixer). The slurry can include, for example, at least about 55% by weight (e.g., at least about 60% by weight, at least about 65% by weight) and/or at most about 75% by weight (e.g., at most about 70% by weight) of iron disulfide. The slurry generally includes at least about 2% by weight (e.g., at least about 2.5% by weight, at least about 4% by weight) and/or at most about 7.5% by weight (e.g., at most about 6% by weight) of one or more conductive materials (e.g., carbon black, graphite). The slurry includes, for example, at least about 1.5% by weight (e.g., at least about 3% by weight) and/or at most about 5% by weight of one or more binders.

The slurry includes, for example, at least about 60% by weight (e.g., at least about 65% by weight, at least about 70% by weight) and/or at most about 85% by weight (e.g., at most about 75% by weight) of slurry solids.

As discussed above, the slurry includes one or more solvents. In some embodiments, the slurry can include one or more solvents having relatively low volatility (e.g., N-methyl-2-pyrrolidone (NMP)) and/or a relatively high viscosity. In certain embodiments, the slurry including one or more of these solvents can be used to form a relatively thick coating on a cathode current collector, and/or to form a cathode that has a relatively low susceptibility to cracking. In some embodiments, the slurry including one or more of these solvents can be used to form a coating that has few or no defects, and/or that is relatively uniform. Examples of solvents include aromatic hydrocarbons (e.g., Shell Sol® A100) and aliphatic hydrocarbons (e.g., Shell Sol® OMS). In some embodiments, the slurry can include one or more normal hydrocarbons (e.g., hexane) and/or branched hydrocarbons. In certain embodiments, the slurry can include one or more iso- and/or cyclic paraffinic solvents (e.g., VM&P Naphtha HT®).

The slurry includes, for example, at least about 25% by weight (e.g., at least about 30% by weight) and/or at most about 40% by weight (e.g., at most about 35% by weight) of solvent.

The slurry can have a viscosity of at least about 3,000 cps (e.g., at least about 5,000 cps, at least about 8,000 cps), and/or at most about 30,000 cps (e.g., at most about 25,000 cps). As used herein, the viscosity of a slurry is measured using a Brookfield® DV III viscometer, available from Brookfield Engineering Laboratories. The viscosity is measured immediately after mixing and at room temperature. A spindle #7 is used at 50 RPM.

Figure 3B:
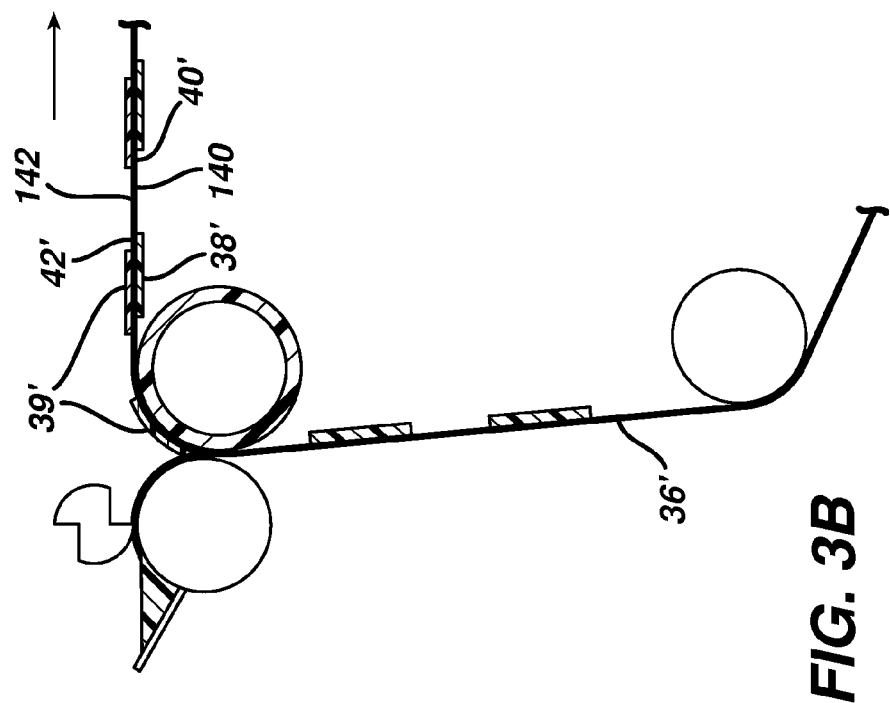
FIGS. 3A and 3B are schematic views of a coating process.
Figure 3A:
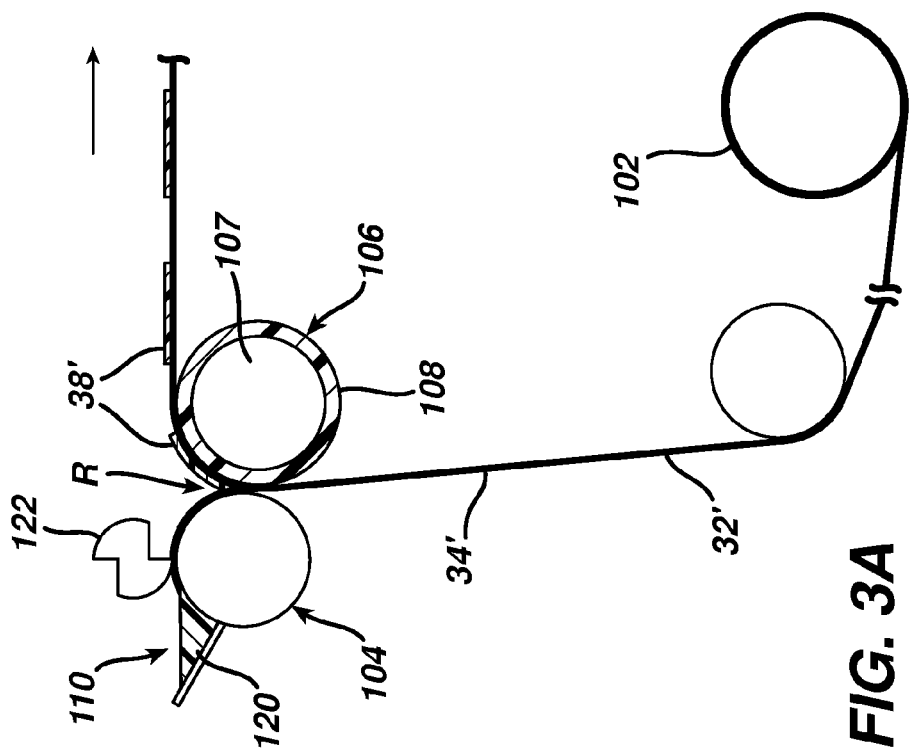

Referring to FIGS. 3A and 3B, slurry 110 is coated onto a continuous sheet 32' of foil using an intermittent reverse roll coating process. Sheet 32' is introduced from a spool 102 to a region R located between two counter-rotating rolls 104 and 106. Roll 106 includes an inner portion 107 formed of a metal and an outer portion 108 surrounding the inner portion that is made of a high friction, resilient, and chemically inert material such as a highly crosslinked rubber. Outer portion 108 pulls sheet 32' through region R. Slurry 110 is applied to roll 104 from a reservoir 120. Excess slurry is removed by a knife edge roller 122, which can assist in the application of an uniform coating thickness onto roll 104. Roll 104 transfers slurry 110 to a first side 34' of sheet 32'. Rolls 104 and 106 can separate and interrupt application of slurry 110 to sheet 32' to form slurry patches 38'. Separation of rolls 104 and 106 can also produce uncoated spaces 140 between adjacent slurry patches 38'. Separation of rolls 104 and 106 can be cam or computer controlled.

The coating speed is variable from one cathode to a different cathode. This can, for example, allow for the application of slurry coatings having varying viscosities. As an example, relatively viscous slurries can be applied to a continuous sheet using a relatively slow coating speed. In some embodiments, coating speed can be varied for a given continuous sheet. This can, for example, result in a cathode having non-uniform slurry patches on the sheet.

The coating speed can be, for example, at least about 0.1 meter per minute (e.g., about 0.3 meter per minute, at least about 1 meter per minute), and/or at most about 3 meters per minute (e.g., at most about 2.5 meters per minute, or at most about 2 meters per minute).

After first side 34' of continuous sheet 32' has been coated with patches 38', the patches are dried by passing the sheet through multiple drying zones (e.g., three drying zones) in which heated air is directed at the wet surface. The air speed and temperature are gradually ramped up from zone to zone. The coated sheet can be dried, for example, for about 0.5 minutes to 15 minutes in each zone. In certain embodiments, a multi-zone dryer can include a zone having a temperature of about 40° C., a zone having a temperature of about 60° C., and a zone having a temperature of about 130° C. The coated sheet can pass through the drying zones at a line speed, for example, of at least about 0.5 meter per minute (e.g., at least about 0.7 meter per minute) and/or at most 0.8 meter per minute.

The coating and drying processes described above can be repeated on second side 36' of continuous sheet 32' (FIG. 3B), to produce a continuous sheet of foil having dried patches 38' on side 34' and dried patches 39' on side 36'. Second side 36' includes uncoated spaces 142 between slurry patches 39'. Uncoated portions 40' of spaces 140 are opposite portions of slurry patches 39', and uncoated portions 42' of spaces 142 are opposite portions of slurry patches 38'. Uncoated portions 40' are shorter in length than uncoated portions 42'.

After patches 39' have been dried, the continuous sheet with patches 38' and 39' is calendered using a four-roll modified "Z" calender. The calender rolls can be heated and/or cooled as needed. In some embodiments, the sheet can be calendered off-line, in a continuous mode (e.g., reel-to-reel). In certain embodiments, a 2×2 roll configuration with two nips, or a two-roll configuration with one nip, can be used. In certain embodiments, calendering can occur at a temperature of at least about 25° C. and/or at most about 60° C. In some embodiments, the calender can have a line speed of at least about 0.3 meter per minute (e.g., at least about 0.5 meter per minute, at least about 0.8 meter per minute) and/or at most about 1.2 meters per minute (e.g., at most about 1 meter per minute). In some embodiments, elongation of the sheet after calendering is less than 1.5%.

In some embodiments, coatings 38 and 39 have a porosity of at least about 15% (e.g., at least about 25%), and/or at most about 35% (e.g., at most about 30%). As used herein, porosity is equal to the percentage by volume of the coating that is occupied by pores. Porosity is calculated according to equation (2) below, in which $V_{final}$=volume of the coating in the final cathode, and $V_{theo}$=theoretical volume of the coating:

$$P = \frac{(V_{final} - V_{theo})/V_{final}}{Vsample} = \frac{(Vsample - (Vsample - Vfoil))}{Vsample}$$

In certain embodiments, as a result of calendering, the final cathode can have a thickness that is at most about 85% (e.g., at most about 80%) and/or at least about 55% (e.g., at least about 70%) of the thickness of the continuous sheet, with patches 38' and 39', prior to calendering.

Continuous sheet 32' is cut at appropriate points along its length to provide cathodes 16. For a AA batter, cathode 16 can have a length, for example, from about 275 mm to about 400 mm (e.g., from about 310 mm to about 350 mm); for a AAA battery, cathode 16 can have a length, for example, from about 120 mm to about 180 mm (e.g., from about 140 mm to about 160 mm).

Anode 12 includes one or more anode active materials, usually in the form of an alkali metal (e.g., lithium, sodium, potassium) and/or an alkaline earth metal (e.g., calcium, magnesium). Anode 12 can include an alloy of an alkali metal (e.g., lithium) and an alkaline earth metal and/or an alloy of an alkali metal and aluminum. For example, in some embodiments, anode 12 can include a lithium-aluminum alloy. Anode 12 may include a substrate (e.g., a current collector), or may not include a substrate. In some embodiments, anode 12 can include one or more binders. Examples of binders include polyethylene, polypropylene, styrene-butadiene rubbers, and polyvinylidene fluoride (PVDF). In some embodiments in which anode 12 includes one or more binders, the anode active materials can include tin-based materials, carbon-based materials (e.g., carbon, graphite, an acetylenic mesophase carbon, coke), metal oxides, and/or lithiated metal oxides. The anode active material and one or more binders can be mixed to form a paste which can be applied to a substrate.

The electrolyte can be in liquid, solid or gel (polymer) form. In some embodiments, the electrolyte can include an organic solvent such as propylene carbonate (PC), ethylene carbonate (EC), dimethoxyethane (DME) (e.g., 1,2-dimethoxyethane), butylene carbonate (BC), dioxolane (DX), tetrahydrofuran (THF), gamma-butyrolactone, diethyl carbonate (DEC), dimethyl carbonate (DMC), ethyl methyl carbonate (EMC), dimethylsulfoxide (DMSO), methyl formiate (MF), or a combination (e.g., a mixture) thereof. In certain embodiments, the electrolyte can include an inorganic solvent, such as $SO_2$ or $SOCl_2$. In some embodiments, the electrolyte can include one or more salts (e.g., two salts, three salts, four salts). Examples of salts include lithium salts, such as lithium trifluoromethanesulfonate (LiTFS), lithium trifluoromethane-sulfonimide (LiTFSI), and lithium hexafluorophosphate ($LiPF_6$). Additional lithium salts that can be included are described, for example, in Suzuki, U.S. Pat. No. 5,595,841. Other salts that can be included in the electrolyte are bis(oxalato)borate salts. Bis(oxalato)borate salts are described, for example, in Totir et al., U.S. Patent Application Publication No. US 2005/0202320 A1, published on Sep. 15, 2005, and entitled "Non-Aqueous Electrochemical Cells".

Positive lead 18 can include stainless steel, aluminum, an aluminum alloy, nickel, titanium, or steel. Positive lead 18 can be annular in shape, and can be arranged coaxially with the cylinder of a cylindrical cell. Positive lead 18 can also include radial extensions in the direction of cathode 16 that can engage the current collector. An extension can be round (e.g., circular or oval), rectangular, triangular or another shape. Positive lead 18 can include extensions having different shapes. Positive lead 18 and the current collector are in electrical contact. Electrical contact between positive lead 18 and the current collector can be achieved by mechanical contact. In some embodiments, positive lead 18 and the current collector can be welded together.

Separator 20 can be formed of any of the standard separator materials used in electrochemical cells. For example, separator 20 can be formed of polypropylene (e.g., nonwoven polypropylene, microporous polypropylene), polyethylene, and/or a polysulfone. Separators are described, for example, in Blasi et al., U.S. Pat. No. 5,176,968.

Case 22 can be made of, for example, one or more metals (e.g., aluminum, aluminum alloys, nickel, nickel plated steel, stainless steel) and/or plastics (e.g., polyvinyl chloride, polypropylene, polysulfone, ABS, polyamide).

Cap 24 can be made of, for example, aluminum, nickel, titanium, or steel.

While electrochemical cell 10 in FIG. 1 is a primary cell, in some embodiments a secondary cell can have a cathode that includes the above-described cathode material. Primary electrochemical cells are meant to be discharged (e.g., to exhaustion) only once, and then discarded. Primary cells are not intended to be recharged. Primary cells are described, for example, in David Linden, *Handbook of Batteries* (McGraw-Hill, 2d ed. 1995). Secondary electrochemical cells can be recharged for many times (e.g., more than fifty times, more than a hundred times, or more). In some cases, secondary cells can include relatively robust separators, such as those having many layers and/or that are relatively thick. Secondary cells can also be designed to accommodate for changes, such as swelling, that can occur in the cells. Secondary cells are described, for example, in Falk & Salkind, "Alkaline Storage Batteries", John Wiley & Sons, Inc. 1969, and DeVirloy et al., U.S. Pat. No. 345,124.

To assemble the cell, separator 20 can be cut into pieces of a similar size as anode 12 and cathode 16 and placed therebetween, as shown in FIG. 1. Separator 20 can be wound on a mandrel and then, after 1.25 to 1.5 wraps, cathode 16 is fed in, followed by anode 12. Anode 12, cathode 16, and separator 20 are then placed within case 22, which is then filled with the electrolytic solution and sealed. One end of case 22 is closed with cap 24 and annular insulating gasket 26, which can provide a gas-tight and fluid-tight seal. Positive lead 18 connects cathode 16 to cap 24. Safety valve 28 is disposed in the inner side of cap 24 and is configured to decrease the pressure within electrochemical cell 10 when the pressure exceeds some predetermined value. Methods for assembling an electrochemical cell are described, for example, in Moses, U.S. Pat. No. 4,279,972, Moses et al., U.S. Pat. No. 4,401,735, and Kearney et al., U.S. Pat. No. 4,526,846.

Other configurations of an electrochemical cell can also be used, including, for example, the button or coin cell configuration, the prismatic cell configuration, the rigid laminar cell configuration, and the flexible pouch, envelope or bag cell configuration. Furthermore, an electrochemical cell can have any of a number of different voltages (e.g., 1.5 V, 3.0 V, 4.0 V). Electrochemical cells are described, for example, in Berkowitz et al., U.S. patent application Ser. No. 10/675,512, filed on Sep. 30, 2003, and entitled "Batteries"; Berkowitz et al., U.S. Patent Application Publication No. US 2005/0112467 A1, published on May 26, 2005, and entitled "Battery Including Aluminum Component"; and Totir et al., U.S. Patent Application Publication No. 2005/0202320 A1, published on Sep. 15, 2005, and entitled "Non-Aqueous Electrochemical Cells".

The following examples are meant to be illustrative and not to be limiting.

EXAMPLES

Example 1

About 150 cathodes were prepared according to the following process.

First, 1.96 grams of Kraton® G1651 polymer, 58.95 grams of $FeS_2$, 0.71 gram of carbon black, and 4.77 grams of graphite powder were dispersed in a mixture of 13.41 grams of Shell Sol® A100 and 20.20 grams of Shell Sol® OMS using a double planetary mixer to form a slurry. The slurry had a viscosity of 5500 mPas (SI units where 1 mPas=1 cps) at 28° C. and 12000 mPas at 21° C., which was determined using a Brookfield® viscometer, model DV III. A spindle #7 was used at 50 RPM.

Then, the slurry was coated onto both sides of a current collector formed of a 20-micron thick, temper H18 foil of aluminum alloy 1N30. The slurry was coated onto the current collector in two passes (one pass per side) using an intermittent reverse roll coater, at a speed of 0.5 meters per minute, and a gap setting of 0.305 mm. The first pass of the slurry was coated onto 336 mm of the length of first side of the current collector. On the second pass, the slurry was coated onto 295 mm of the length of the second side of the current collector. The current collector had an uncoated trailing segment of 11 mm on the first side, while an uncoated leading segment of 41 mm was on the second side.

Next, the slurry was dried by passing the slurry through a dryer having three zones. The slurry was dried for 3 minutes at a first zone at a temperature of about 40° C., for 3 minutes at a second zone at a temperature of about 60° C., and for 3 minutes at a third zone at a temperature of about 130° C. When the slurry had dried, it had a thickness of 0.242 millimeters (including coating on both sides and foil).

Finally, the cathode that resulted from the drying process was calendered at a line speed of 0.9 meters per minute to a final thickness of 0.175 millimeters. After calendering, the cathode had a porosity of about 21.2% of the volume of the cathode material.

After the cathode had been calendered, the cathode included 23.6 milligrams of cathode material per square centimeter of each side of the current collector.

The cathode was incorporated into an AA cell.

OTHER EMBODIMENTS

While certain embodiments have been described, other embodiments are possible. For example, although side 34 of current collector 32 includes only one uncoated surface (40), in some embodiments it can include two or more uncoated surfaces. Similarly, although side 36 includes only one uncoated surface (42), in certain embodiments it can include two or more uncoated surfaces.

Moreover, although uncoated surface 40 roughly corresponds in length to the core spiral in cathode 16, uncoated surface 40 can have a shorter length (e.g., less than about 50% or less than about 75%) of the length of core spiral. Similarly, although uncoated surface 42 roughly corresponds in length to the outer surface of cathode 16, uncoated surface 42 can have a shorter length (e.g., less than about 50% or less than about 75% of the length of the outer surface).

While intermittent roll-coating process has been described, in some embodiments, coating processes such as extrusion die coating can be used to coat current collectors.

All references, such as patent applications, publications, and patents, referred to herein are incorporated by reference in their entirety.

Other embodiments are within the claims.

What is claimed is:

1. A method of making an electrode for a battery, the method comprising
   (a) coating a slurry including an electrode active material onto a first side and a second side of a current collector using an intermittent coating process to provide a plurality of first patches of the slurry on the first side separated by uncoated spaces and a plurality of second patches of the slurry on the second side separated by uncoated spaces,
      wherein each of the first patches overlaps lengthwise with one of the second patches,
      wherein a lengthwise portion on the second side opposite each of the first patches is not coated with slurry,
      wherein a lengthwise portion on the first side opposite each of the second patches is not coated with slurry; and
      wherein the uncoated lengthwise portions on the second side are longer than the uncoated lengthwise portions on the first side;
   (b) cutting the current collector at lengthwise points to provide a plurality of individual electrodes, each individual electrode including one of the first patches, one of the second patches, one of the uncoated lengthwise portions on the first side, and one of the uncoated lengthwise portions on the second side; and
   (c) winding each of the individual electrodes lengthwise into a spiral configuration having a core spiral having an inner surface including the uncoated lengthwise portion on the first side of the current collector and an outer spiral having an outer surface including the uncoated lengthwise portion on the second side of the current collector.

2. The method of claim 1, wherein the first patches are at least about 5% longer than the second patches.

3. The method of claim 1, wherein the current collector is a foil comprising aluminum provided by step (a) before performing steps (b) and (c).

4. The method of claim 1, further comprising drying and calendering the coated current collector provided by step (a) before performing steps (b) and (c).

5. The method of claim 1, wherein the intermittent coating process is reverse roll coating.

6. The method of claim 1, wherein the uncoated lengthwise portions on the second side are at least 15% longer than the uncoated lengthwise portions on the first side.

7. The method of claim 1, wherein the current collector in each individual electrode has two ends, wherein at least one end of the current collector is uncoated on the first side and the second side of the current collector.

8. The method of claim 1, wherein at least 50% of the inner surface of the core spiral is not covered by the first patch.

9. The method of claim 8, wherein at least 50% of the outer surface of the outer spiral is not covered by the second patch.

10. The method of claim 1, wherein at least 50% of the outer surface of the outer spiral is not covered by the second patch.

11. The method of claim 1, wherein during step (a) the first patches of the slurry are coated onto the first side of the current collector before the second patches of the slurry are coated onto the second side of the current collector.

12. A method of making an electrode for a battery, the method comprising
   (a) coating a slurry including an electrode active material onto a first side and a second side of an electrode current collector using an intermittent coating process to provide a plurality of first patches of the slurry on the first side separated by uncoated spaces and a plurality of second patches of the slurry on the second side separated by uncoated spaces, wherein each of the first patches overlaps lengthwise with one of the second patches, and wherein a lengthwise portion on the first side opposite each of the second patches is not coated with slurry;
   (b) cutting the collector at lengthwise points to provide a plurality of individual electrodes, each individual electrode including one of the first patches, one of the second patches, and one of the uncoated lengthwise portions on the first side; and
   (c) winding each of the individual electrodes lengthwise into a spiral configuration having a core spiral having an inner surface including the uncoated lengthwise portion on the first side of the current collector, wherein at least 50% of the inner surface of the core spiral is not covered by the first patch;

wherein after step (a) a lengthwise portion on the second side opposite each of the first patches also is uncoated, and wherein after step (b) each of the individual electrodes also includes one of the uncoated lengthwise portions on the second side.

13. The method of claim 12, wherein the spiral configuration also has an outer spiral having an outer surface including the uncoated lengthwise portion on the second side of the current collector, and wherein at least 50% of the outer surface of the outer spiral is not covered by the second patch.

* * * * *